J. JONES.
CULTIVATOR.
No. 191,347.  Patented May 29, 1877.
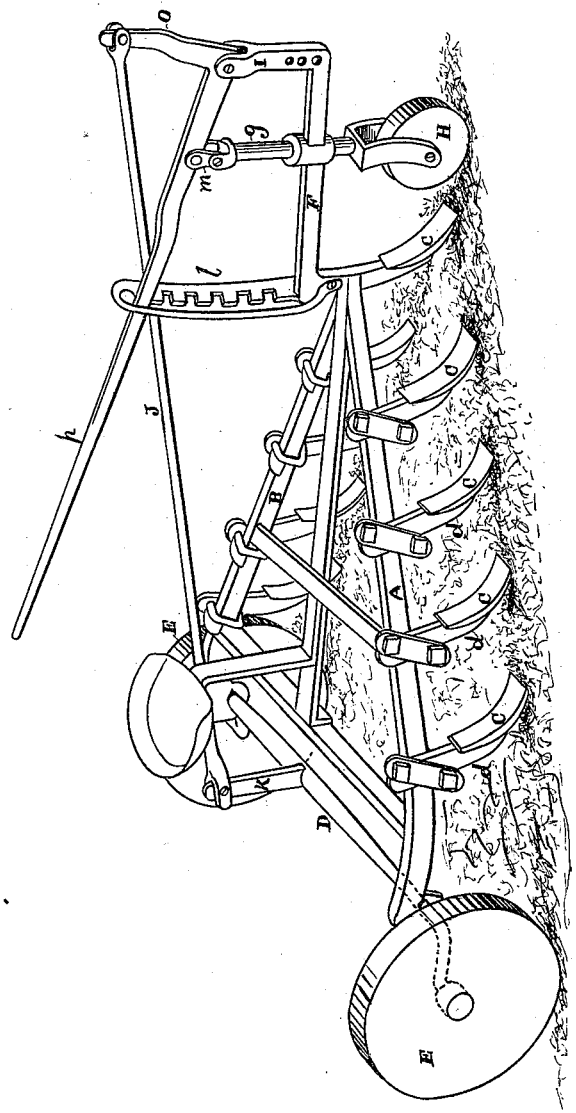
Witnesses
Geo. H. Strong
Jno. L. Boone
Inventor
John Jones
by Dewey & Co
Attys.

UNITED STATES PATENT OFFICE.

JOHN JONES, OF STONY POINT, CALIFORNIA, ASSIGNOR OF TWO-THIRDS HIS RIGHT TO SIDNEY B. HOLLY AND WILLIAM H. MAGOON.

IMPROVEMENT IN CULTIVATORS.

Specification forming part of Letters Patent No. 191,347, dated May 29, 1877; application filed January 15, 1877.

*To all whom it may concern:*

Be it known that I, JOHN JONES, of Stony Point, county of Sonoma, and State of California, have invented Improvements in Cultivators; and I do hereby declare the following to be a full, clear, and exact description thereof, reference being had to the accompanying drawings:

My invention relates more particularly to that class of plows or cultivators in which the plows or cultivator-teeth are attached to the two diverging timbers of a V-shaped frame, which frame is mounted upon two rear wheels and a front swivel or steering-wheel.

My improvement consists in a novel combination of levers for enabling the driver to raise and lower the frame and plows without leaving his seat, all as hereinafter described.

Referring to the accompanying drawings, A and B represent the two diverging timbers or beams of a V-shaped plow or cultivator. The plows or cultivator-teeth C C C are secured to the standards $d$ $d$ $d$, while the upper ends of the standards are secured to the beams in the ordinary way. The rear ends of the beams are supported upon an axle, D, which is cranked at both ends, and upon the journal formed by each crank is a bearing-wheel, E.

A strong beam, F, has its rear end firmly secured between the forward ends of the timbers A B, so that it will project forward a short distance in advance of the frame and front plow, similar to the beam of a single plow. A hole is made through this beam, through which the vertical spindle $g$ of the front or swivel wheel H passes. The forward end of this beam or short pole is turned upward so as to form a standard, I, and is provided with holes for the attachment of the clevis or whiffle-trees, as represented. To provide for raising and lowering the frame and plows, I attach the angle of a bent lever to the upper end of the standard I. The short arm O of this lever extends upward, and its extremity is connected with the extremity of an arm, K, which projects from the rear axle D, at a right angle to the cranks upon which the wheels are carried by means of a connecting-rod, J, which passes back over the frame and under the driver's seat. The long arm $p$ of the bent lever extends directly back through a rack, $l$, near the driver's seat, so that it can be easily grasped by the driver. The upper end of the vertical spindle $g$ of the steering-wheel is connected with the long arm $p$ of the lever near the fulcrum by means of a link, $m$, so that the movement of said lever operates to rotate the rear axle about its cranks and raise or lower the beam F on the spindle $g$.

When the frame is to be lowered, the driver frees the lever-arm $p$ from the rack and raises it, thus dropping the beam F on the spindle, and, through the arms O K and rod J, turns the crank-axle so as to lower the rear end correspondingly. A reverse or downward motion of the lever transfers the fulcrum of the lever-arm $p$ from the standard I to the upper end of the spindle $g$, and rotates the crank-axle in an opposite direction, thus lifting both the frame and plows out of and above the ground.

This arrangement of levers is very simple and convenient, and the power of the driver is applied at the best possible advantage.

Having thus described my invention, what I claim as new, and desire to secure by Letters Patent, is—

The combination, with the plow-frame A B, having its rear end mounted upon the axle D, of the beam-extension F, provided with the rack $l$, spindle $g$, driving-wheel H, and upward-turned standard I, and secured to the front of the frame, and lever O $p$ pivoted to standard I and spindle $g$, and connecting-rod J, which passes back over the frame and under the driver's seat, and rod K secured to the rear axle, the several parts constructed and arranged to operate together in the manner herein shown and described.

In witness whereof I have hereunto set my hand and seal.

JOHN JONES. [L. S.]

Witnesses:
 THOS. J. ABLES,
 W. DUTTON.